United States Patent
Hashimoto et al.

(10) Patent No.: US 11,533,006 B2
(45) Date of Patent: Dec. 20, 2022

(54) MOTOR CONTROLLING DEVICE AND ON-BOARD SYSTEM PROVIDED WITH THE SAME

(71) Applicants: Mazda Motor Corporation, Hiroshima (JP); U-Shin Ltd, Nagano (JP)

(72) Inventors: Tsuyoshi Hashimoto, Aki-gun (JP); Naoki Takasuka, Aki-gun (JP); Shinya Kanayama, Aki-gun (JP); Kazuhiko Obatake, Aki-gun (JP); Hideyuki Osumi, Aki-gun (JP); Makoto Kobayashi, Kure (JP)

(73) Assignees: MAZDA MOTOR CORPORATION, Hiroshima (JP); U-SHIN LTD, Nagano (JP)

( * ) Notice: Subject to any disclaimer, the term of this patent is extended or adjusted under 35 U.S.C. 154(b) by 0 days.

(21) Appl. No.: 17/162,204

(22) Filed: Jan. 29, 2021

(65) Prior Publication Data

US 2021/0249976 A1  Aug. 12, 2021

(30) Foreign Application Priority Data

Feb. 12, 2020  (JP) .............................. JP2020-021311

(51) Int. Cl.
*H02P 5/68* (2006.01)
*H02P 7/03* (2016.01)
*H02P 7/29* (2016.01)

(52) U.S. Cl.
CPC ................ *H02P 5/68* (2013.01); *H02P 7/04* (2016.02); *H02P 7/29* (2013.01)

(58) Field of Classification Search
CPC ...... H02P 5/68; H02P 7/04; H02P 7/29; H02P 29/50
See application file for complete search history.

(56) References Cited

U.S. PATENT DOCUMENTS

| | | | | |
|---|---|---|---|---|
| 2014/0361720 | A1* | 12/2014 | Miyachi | .................... H02P 6/16 318/400.39 |
| 2015/0155816 | A1* | 6/2015 | Saito | ....................... H02M 1/08 318/139 |

FOREIGN PATENT DOCUMENTS

| | | | |
|---|---|---|---|
| JP | 2006044479 A | * | 2/2006 |
| JP | 2006044479 A | | 2/2006 |

* cited by examiner

*Primary Examiner* — Muhammad S Islam
*Assistant Examiner* — Bradley R Brown
(74) *Attorney, Agent, or Firm* — Alleman Hall Creasman & Tuttle LLP (57) ABSTRACT

A motor controlling device configured to control an on-board motor is provided, which includes an H-bridge type drive circuit comprised of first switching elements and configured to drive the on-board motor, and a controlling circuit configured to control the on-board motor by controlling the drive circuit, the controlling circuit carrying out an ON control of one of the first switching elements connected to ground, when not operating the on-board motor.

10 Claims, 9 Drawing Sheets

MOTOR CONTROLLING DEVICE AND ON-BOARD SYSTEM PROVIDED WITH THE SAME

TECHNICAL FIELD

The technology disclosed herein belongs to a technical field related to a motor controlling device which controls an on-board motor, and an on-board system provided with the motor controlling device.

BACKGROUND OF THE DISCLOSURE

JP2006-044479A discloses a configuration for reducing electromagnetic noise emitted through a steering shaft by lowering the electric potential of the steering shaft toward the ground.

However, it is based on a premise that the steering shaft does not transmit an electrical signal, and, for example, signal wiring which transmits the electrical signal, such as wiring which connects an H-bridge circuit to a motor, cannot be lowered to the ground.

Moreover, in order for the signal wiring which transmits the electrical signal not to be influenced by noise from the outside, it is possible to shield the signal wiring (wire harness). However, the manufacturing cost increases and the weight of a vehicle becomes heavier, and therefore, fuel efficiency may be affected.

SUMMARY OF THE DISCLOSURE

The technology disclosed herein is made in view of the above situation, and one purpose thereof is to reduce an effect of electromagnetic noise by secondary radiation from signal wiring which is unfixable to the ground.

According to one aspect of the present disclosure, a motor controlling device configured to control an on-board motor, is provided. The device includes a drive circuit of H-bridge type comprised of a plurality of first switching elements and configured to drive the on-board motor, and a controlling circuit configured to control the on-board motor by controlling the drive circuit. The controlling circuit carries out an ON control of at least one of the plurality of first switching elements connected to a ground, when not operating the on-board motor.

According to this configuration, output lines of the drive circuit for driving the suspended motor can be lowered to the ground potential (grounded), and therefore, an effect of electromagnetic noise by secondary radiation can be reduced.

Each switching element may be a field-effect transistor (FET).

According to this configuration, the reaction speed of the motor controlling device is improved.

DETAILED DESCRIPTION OF THE DISCLOSURE

Hereinafter, exemplary embodiments will be described in detail with reference to the accompanying drawings.

First Embodiment

Figure 1:
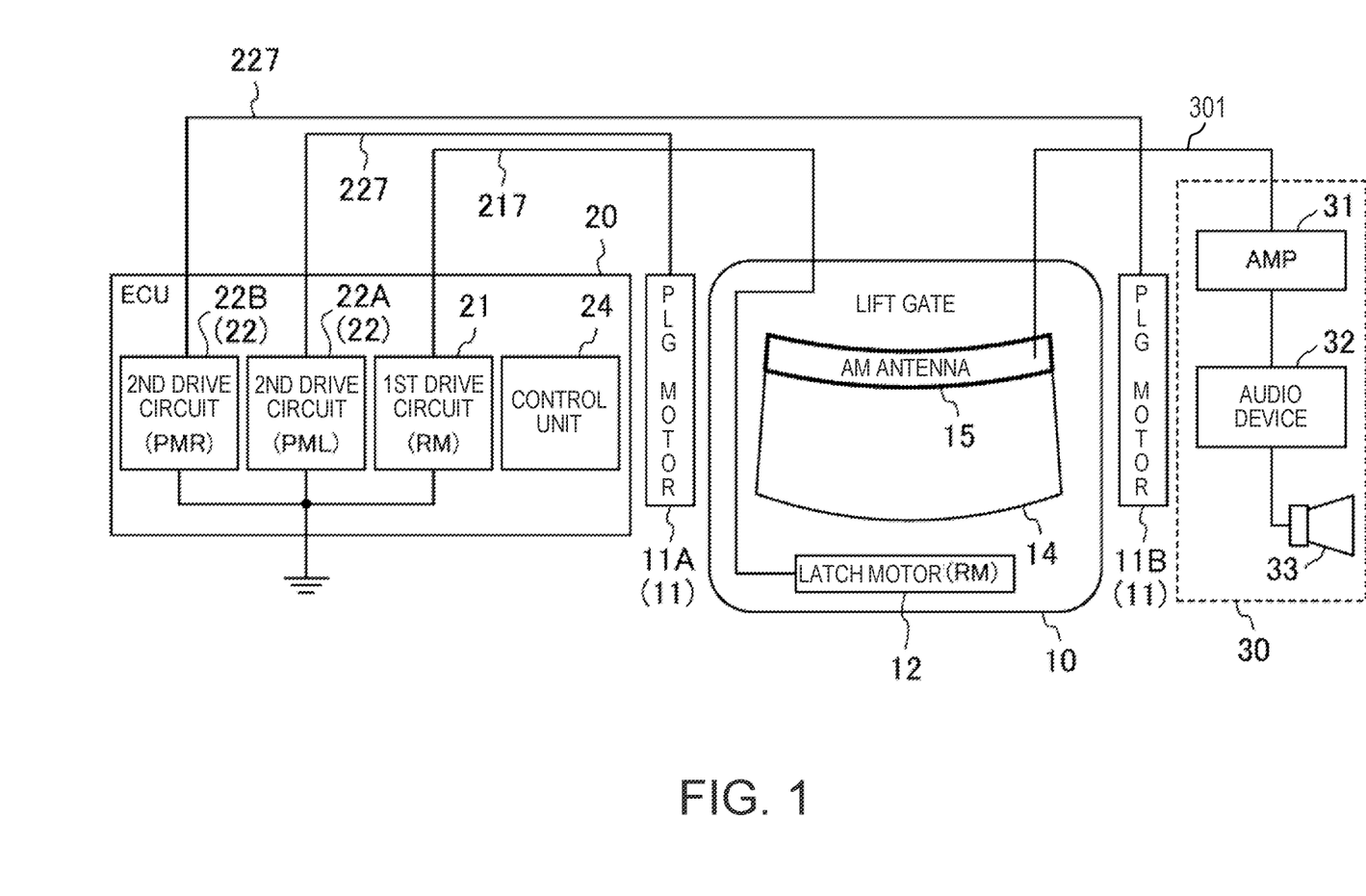
FIG. 1 is a block diagram illustrating a configuration of an on-board system of a first embodiment.

FIG. 1 is a block diagram schematically illustrating a configuration of an on-board system according to the first embodiment. Note that FIG. 1 illustrates a configuration for exhibiting a function as the system of this embodiment, and does not illustrate all the functions in connection with the on-board system.

The on-board system includes a lift gate 10 of an automatic opening-and-closing type, an electronic control unit (ECU) 20 for controlling opening and closing of the lift gate 10, and an audio system 30 which can playback radio broadcasting, TV broadcast, etc.

The lift gate 10 is a so-referred to as "automatic opening-and-closing type" lift gate where it is automatically opened and closed by a drive unit (not illustrated) having a well-known structure which is provided on both sides of the vehicle body and is provided between a vehicle body and the lift gate 10. Moreover, the lift gate 10 is provided with a latch mechanism (not illustrated) for locking when the lift gate 10 is in a closed state and unlocking when it is opened from the closed state.

The latch mechanism has a well-known structure comprised of, for example, a pin-shaped striker fixed to the vehicle-body side, and a fork-shaped latch provided internally on the lift gate 10 side. Then, when the lift gate 10 is closed, the latch restrains the striker and the lift gate 10 is locked mechanically as it is. The latch mechanism is driven by a latch motor 12. In this embodiment, the latch motor 12 is a DC motor with brush having a well-known structure. The latch motor 12 is one example of a first on-board motor.

The drive unit includes a left power lift gate (PLG) motor 11A for driving a drive unit on the left side of the vehicle, and a right PLG motor 11B for driving a drive unit on the right side of the vehicle. The left PLG motor 11A and the right PLG motor 11B have substantially the same configuration, and when not distinguishing one from the other, they are simply referred to as the "PLG motor 11." The PLG motor 11 is a motor for PLG having a pulse generator. Although illustration is omitted, in this embodiment, the PLG motor 11 is a DC motor with brush having a well-known structure. The PLG motor 11 is one example of a second on-board motor.

A receiving antenna 15 for receiving radio broadcasting, TV broadcast, etc. is disposed on a rear window glass 14 of the lift gate 10. Note that the position of the receiving antenna 15 is not limited to the rear window glass 14. For example, the receiving antenna 15 may be disposed inside an outer panel (not illustrated) of the lift gate 10. The receiving antenna 15 is one example of an antenna element.

The ECU 20 includes a first drive circuit 21 for driving the latch motor 12, a second drive circuit 22 for driving the PLG motor 11, and a control unit 24. The second drive circuit 22 has a second drive circuit 22A for driving the left PLG motor 11A, and a second drive circuit 22B for driving the right PLG motor 11B. The second drive circuit 22A and the second drive circuit 22B have substantially the same configuration, and when not distinguishing one from the other, they are simply referred to as the "second drive circuit 22."

The control unit 24 has, for example, a CPU (processor). The control unit 24 operates, for example, based on a program stored in memory (not illustrated) of the ECU 20. The control unit 24 controls the opening and closing, and the lock operation of the lift gate 10, for example, based on detection results from sensors (not illustrated) attached to the vehicle, and a command from a central ECU (not illustrated) which controls operation of the entire vehicle. The control unit 24 includes a first pre-driver (not illustrated) having a well-known structure which outputs an RM control signal for controlling each field-effect transistor (FET) of the first drive circuit 21 (described later), and a second pre-driver (not illustrated) having a well-known structure which outputs a PM control signal for controlling each FET of the second drive circuit 22 (described later). The control procedures of the first drive circuit 21 and the second drive circuit 22 by the control unit 24 will be described later. Here, each FET of the first drive circuit 21 is one example of a first switching element, and each FET of the second drive circuit 22 is one example of a second switching element.

The audio system 30 is comprised of an amplifier 31, an audio device 32, and a speaker 33. The amplifier 31, the audio device 32, and the speaker 33 have well-known structures. The broadcast wave received by the receiving antenna 15 is transmitted through an audio wiring 301 and inputted into the audio device 32 through the amplifier 31. The audio wiring 301 is one example of a second wiring. The audio device 32 decodes the received broadcast wave, and playbacks it with the speaker 33.

Figure 2A:
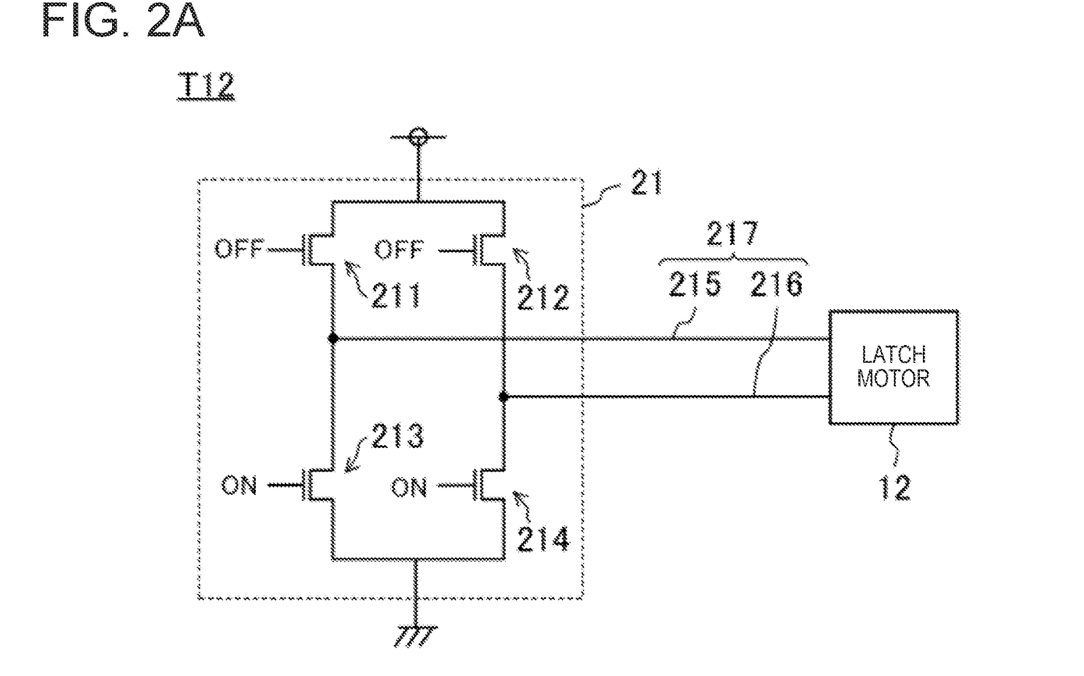
FIGS. 2A and 2B are views illustrating a configuration and an example operation of a first drive circuit and a second drive circuit of the first embodiment, respectively.
Figure 2B:
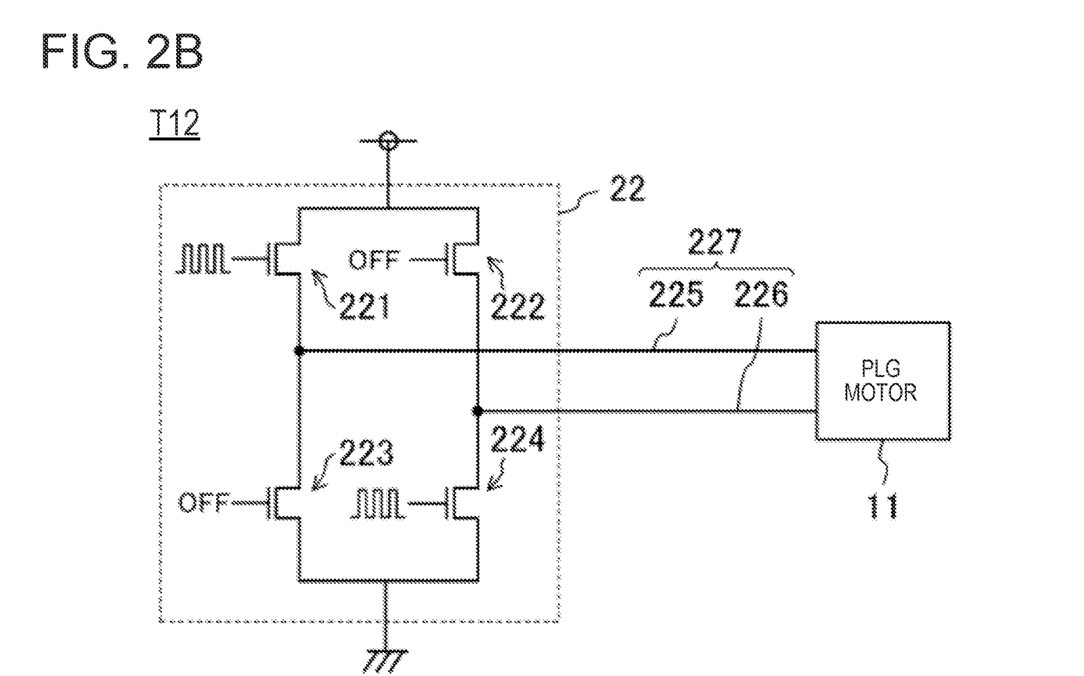
Figure 3A:
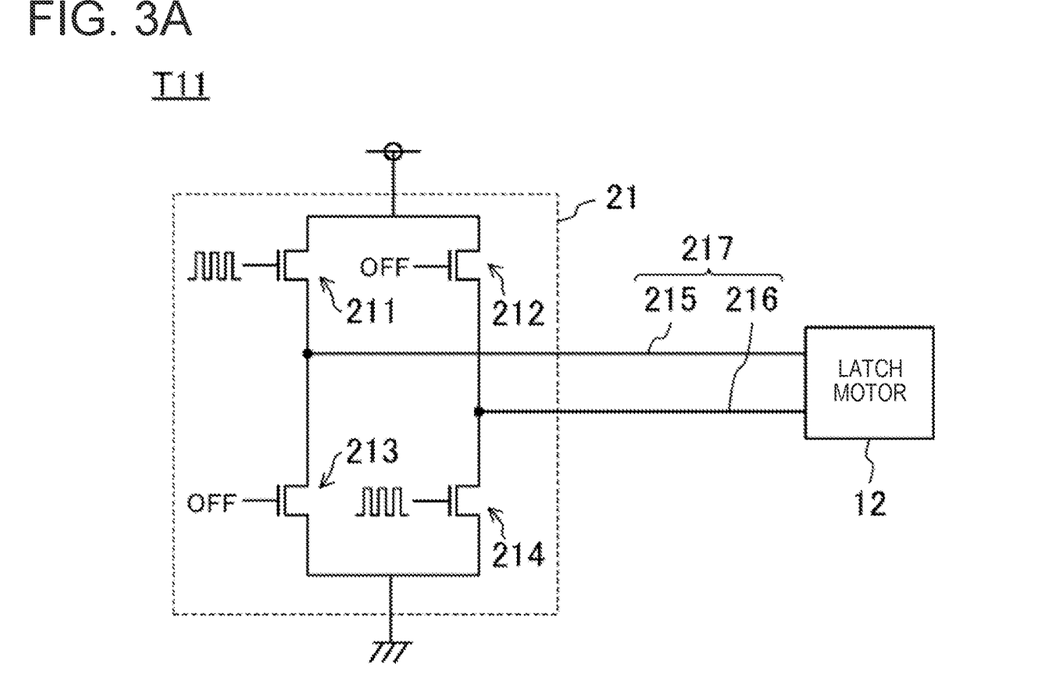
FIGS. 3A and 3B are views illustrating a configuration and another example operation of the first and the second drive circuits of the first embodiment, respectively.
Figure 3B:
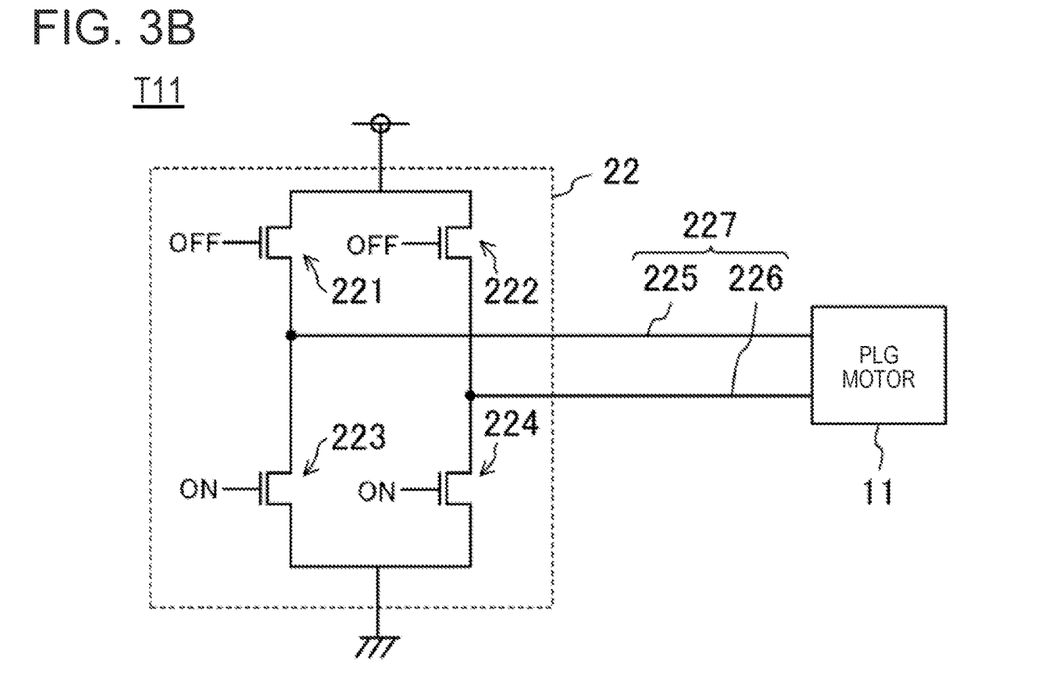
Figure 4:
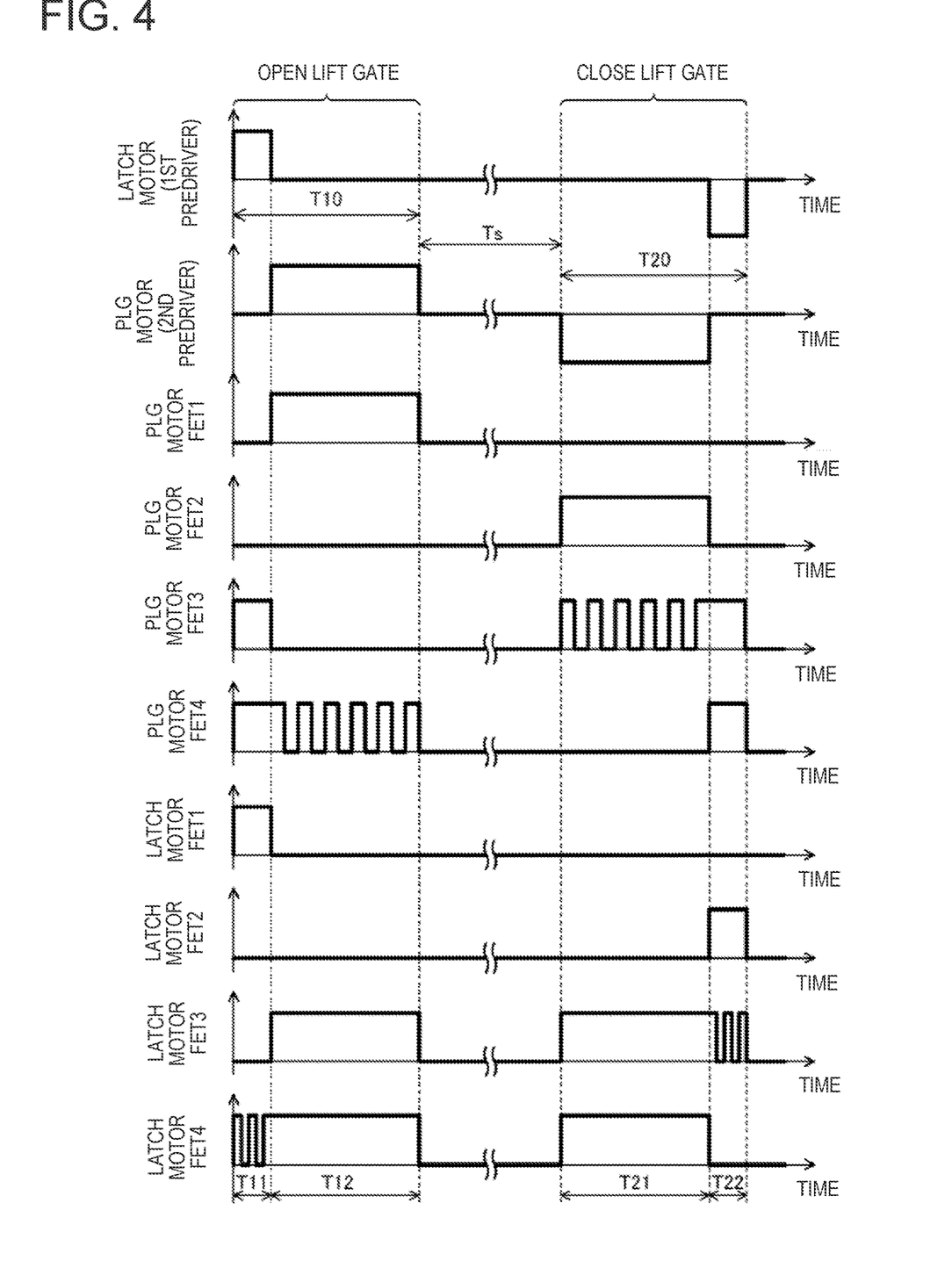
FIG. 4 is a timing chart illustrating operation of a motor controlling device of the first embodiment.

FIGS. 2A and 3A are block diagrams illustrating a configuration of the first drive circuit, and FIGS. 2B and 3B are block diagram illustrating a configuration of the second drive circuit. FIGS. 2A and 3A, and 2B and 3B are the same in the circuit diagram, and therefore, the circuit diagram is described with reference to FIGS. 2A and 2B. A control state of the FET during a period T12 of FIG. 4 is illustrated in FIGS. 2A and 2B, and a control state of the FET during a period T11 of FIG. 4 is illustrated in FIGS. 3A and 3B.

As illustrated in FIG. 2A, the first drive circuit 21 is a circuit of the H-bridge type, where one of a plurality of legs (hereinafter, referred to as the "first leg") is a series circuit of a first FET 211 and a third FET 213, and another leg of the plurality of legs (hereinafter, referred to as the "second leg") is a series circuit of a second FET 212 and a fourth FET 214. An output line 215 is connected to a connection line which connects the first FET 211 and the third FET 213 of the first leg, and an output line 216 is connected to a connection line which connects the second FET 212 and the fourth FET 214 of the second leg. In the following description, the output lines 215 and 216 are collectively referred to as the "RM drive lines 217." The RM drive lines 217 are connected to brush electrodes (not illustrated) of the latch motor 12. The RM drive lines 217 are one example of first wiring.

On/Off of the first FET 211 to the fourth FET 214 of the first drive circuit 21 are controlled by RM control signals outputted from the first pre-driver of the control unit 24. Note that in this disclosure the term "connection" means "electrical connection" and it includes "indirect connection" in addition to "direct connection." The indirect connection includes, for example, a connection through a passive element, such as a filter, and a connection through an active element having a simple configuration, such as a relay.

The second drive circuit 22 is a circuit of the H-bridge type, where one of a plurality of legs (hereinafter, referred to as the "third leg") is a series circuit of the first FET 221 and the third FET 223, and another leg of the plurality of legs (hereinafter, referred to as the "fourth leg") is a series circuit of the second FET 222 and the fourth FET 224. An output line 225 is connected to a connection line which connects the first FET 221 and the third FET 223 of the third leg, and an output line 226 is connected to a connection line which connects the second FET 222 and the fourth FET 224 of the fourth leg. Below, the output lines 225 and 226 are collectively referred to as "PM drive lines 227." The PM drive lines 227 are connected to brush electrodes (not illustrated) of the PLG motor 11.

On/Off of the first FET 221 to the fourth FET 224 of the second drive circuit 22 is controlled by PM control signals outputted from the second pre-driver of the control unit 24.

FIG. 4 is a timing chart illustrating operation of a motor controlling device of the first embodiment. In the example of FIG. 4, an opening operation of the lift gate is performed during a period T10 (T11, T12) on the left side of this drawing, and a closing operation of the lift gate is performed during a period T20 (T21, T22) on the right side of this drawing.

During the period T11, the control unit 24 performs an unlock control of the latch mechanism. In detail, in order to carry out the unlock operation of the latch mechanism, a first rectangular wave (positive voltage) is inputted into the first pre-driver, and a ground potential indicating that the door of the lift gate 10 is not operated is inputted into the second pre-driver. Then, as illustrated in FIG. 3A, the first pre-driver carries out an OFF control of the second FET 212 and the third FET 213 of the first drive circuit 21. Moreover, the first pre-driver carries out an ON control of the first FET 211, and outputs a pulse signal at a given period to the fourth FET 214. Note that the controlling method of the first FET 211 and the fourth FET 214 during the period T11 is not limited to the above. For example, the first pre-driver may carry out an ON control of the fourth FET 214 and output a pulse signal at a given period to the first FET 211, or may output a pulse signal at a given period which synchronizes with the first FET 211 and the fourth FET 214. The same can be said for the controlling method of the second FET 212 and the third FET 213 during a period T41 of the second embodiment (described later).

At this time, since the operation of the PLG motor 11 is suspended and the latch motor 12 is driven, the second pre-driver carries out an ON control of the third FET 223 and the fourth FET 224 which are connected to the ground in the second drive circuit 22. At this time, the first FET 221 and the second FET 222 are controlled to OFF. Thus, the electric potential of the PM drive lines 227 can be lowered to ground potential (grounded), and therefore, an occurrence of a crosstalk problem can be avoided.

When the unlock operation of the latch mechanism is finished during the period T11, the control unit 24 performs an open control of the lift gate 10 during the next period T12. In detail, the ground potential indicating that the latch mechanism is not operated is inputted into the first pre-driver, and a second rectangular wave (positive voltage) for driving the PLG motor 11 so that the door of the lift gate 10 moves in an opening direction is inputted into the second pre-driver. Then, as illustrated in FIG. 2B, the second pre-driver carries out an OFF control of the second FET 222 and the third FET 223 of the second drive circuit 22. Moreover, the second pre-driver carries out an ON control of the first FET 221, and outputs a pulse signal at a given period to the fourth FET 224. Note that the controlling method of the first FET 221 and the fourth FET 224 during the period T12 is not limited to the above. For example, the second pre-driver may carry out an ON control of the fourth FET 224 and output a pulse signal at a given period to the first FET 221, or may output a pulse signal at a given period which synchronizes with the first FET 221 and the fourth FET 224.

At this time, since operation of the latch motor 12 is suspended and the PLG motor 11 is driven, the first pre-driver carries out an ON control of the third FET 213 and the fourth FET 214 which are connected to the ground in the first drive circuit 21. At this time, the first FET 211 and the second FET 212 are controlled to OFF. Thus, the electric potential of the RM drive lines 217 can be lowered to ground potential, and an occurrence of the crosstalk problem can be avoided.

A period Ts between the period T10 and the period T20 is a period during which the operation of the lift gate 10 is suspended, and therefore, the ground potential is inputted into both the first pre-driver and the second pre-driver. Then, the first pre-driver carries out an OFF control of the first FET 211 to the fourth FET 214. Similarly, the second pre-driver carries out an OFF control of the first FET 221 to the fourth FET 224.

During the period T21, the control unit 24 performs a close control of the lift gate 10. In detail, the ground potential indicating that the latch mechanism is not operated is inputted into the first pre-driver, and a third rectangular wave (negative voltage) for driving the PLG motor 11 so that the door of the lift gate 10 moves in a closing direction is inputted into the second pre-driver. Then, the second pre-driver carries out an OFF control of the first FET 221 and the fourth FET 224 of the second drive circuit 22. Moreover, the second pre-driver carries out an ON control of the second FET 222 and outputs a pulse signal at a given period to the third FET 223. Note that the controlling method of the second FET 222 and the third FET 223 during the period T21 is not limited to the above. For example, the second pre-driver may carry out an ON control of the third FET 223 and output a pulse signal at a given period to the second FET 222, or may output a pulse signal at a given period which synchronizes with the second FET 222 and the third FET 223.

At this time, since operation of the latch motor 12 is suspended and the PLG motor 11 is driven, the first pre-driver carries out an ON control of the third FET 213 and the fourth FET 214 of the first drive circuit 21. At this time, the first FET 211 and the second FET 212 are controlled to OFF. Thus, the electric potential of the RM drive lines 217 can be lowered to ground potential, and an occurrence of the crosstalk problem can be avoided.

When the closing operation of the door of the lift gate 10 is finished during the period T21, the control unit 24 performs a lock control of the latch mechanism during the next period T22. In detail, in order for the latch mechanism to carry out the lock operation, a fourth rectangular wave (negative voltage) is inputted into the first pre-driver, and the ground potential indicating that the door of the lift gate 10 is not operated is inputted into the second pre-driver. Then, the first pre-driver carries out an OFF control of the first FET 211 and the fourth FET 214 of the first drive circuit 21. Moreover, the first pre-driver carries out an ON control of the second FET 212, and outputs a pulse signal at a given period to the third FET 213. Note that the controlling method of the second FET 212 and the third FET 213 during the period T22 is not limited to the above. For example, the first pre-driver may carry out an ON control of the third FET 213 and output a pulse signal at a given period to the second FET 212, or may output a pulse signal at a given period which synchronizes with the second FET 212 and the third FET 213. The same can be said for the controlling method of the second FET 212 and the third FET 213 during the period T52 of the second embodiment (described later).

At this time, since operation of the PLG motor 11 is suspended and the latch motor 12 is driven, the second pre-driver carries out an ON control of the third FET 223 and the fourth FET 224 of the second drive circuit 22. At this time, the first FET 221 and the second FET 222 are controlled to OFF. Thus, the electric potential of the PM drive lines 227 can be lowered to ground potential, and an occurrence of the crosstalk problem can be avoided.

As described above, according to this embodiment, in the drive circuits connected to the motors in a relationship in which, like the PLG motor 11 and the latch motor 12, while one of them operates, operation of the other is suspended, the FET (the third FET and the fourth FET) connected to the ground, of the drive circuit for driving the suspended motor is controlled to ON. Thus, the output lines of the drive circuit for driving the suspended motor can be lowered to ground potential, and therefore, the effect of the crosstalk and the noise propagated via the ground (via a power source) can be reduced. That is, the effect of the electromagnetic noise by secondary radiation can be reduced. In detail, when all the FETs of the drive circuit are controlled to OFF while the operation is suspended, the output lines of the drive circuit are in a floating state. Then, for example, noise from the output signal line of the drive circuit which runs in parallel and other instruments is superimposed on the output line, and is propagated to adjacent signal wiring (e.g., signal wiring from the receiving antenna 15) while superimposing thereon. Therefore, noise sound may be outputted from the speaker 33. However, according to the configuration of this embodiment, the effect of the electromagnetic noise by such secondary radiation can be reduced.

Particularly, like the latch motor 12 and the PLG motor 11, when the motors are disposed near the vehicle body and they are driven by the same ECU 20, it is assumed that the ground and the power source are common. Moreover, it is assumed that the elements from the drive circuits to the motors are wired with the same wire harness. With such a configuration, it is easy to receive the effect of the noise superposition by the crosstalk and via the ground (via the power source) described above, and the effect by using the technology of the disclosure can be further demonstrated.

Note that although in this embodiment both the first drive circuit 21 for driving the latch motor 12 and the second drive circuit 22 for driving the PLG motor 11 are circuits of the H-bridge type, the present disclosure is not limited to this configuration. For example, even if either the first drive circuit 21 or the second drive circuit 22 is the H-bridge circuit and the other is a different circuit, the technology of the disclosure can still be applied to this configuration and can obtain similar operation and effects.

Moreover, although in this embodiment the latch motor 12 and the PLG motor 11 are pulse-controlled in both the cases where the lift gate 10 is opened (period T10) and the lift gate 10 is closed (period T20), the present disclosure is not limited to this configuration. For example, the pulse control of the latch motor 12 and the PLG motor 11 may be carried out only in either when the lift gate 10 is opened or when the lift gate 10 is closed. Note that if only one of the opening and the closing of the lift gate 10 is pulse-controlled, it is desirable to perform the pulse control when closing of the lift gate 10 which requires higher accuracy.

Moreover, although in this embodiment, the FET(s) connected to the ground of the drive circuit is controlled to ON over the entire suspending period for the suspended motor, when one of the PLG motor 11 and the latch motor 12 is operated and the other is suspended, the present disclosure is not limited to this configuration. For example, the ON control period of the FET(s) connected to the ground may be shortened from the viewpoint of shortening the driving time. In detail, for example, while the PLG motor 11 operates in the closing operation of the lift gate 10, the ON control of the third FET 213 and the fourth FET 214 connected to the latch motor 12 may be canceled, and the control may be switched to operation (pulse control) for lock the latch which is the next operation. That is, the control timings of the latch motor 12 and the PLG motor 11 may be overlapped with each other. Therefore, the driving time can be shortened.

Second Embodiment

In the second embodiment, one example in which the first drive circuit 21 is a circuit of the H-bridge type, and the second drive circuit 22 is a circuit of another type (pulse drive type) is described. Note that in this embodiment, the differences from the first embodiment are mainly described, and the description of the common configurations and operations may be omitted.

Figure 6:
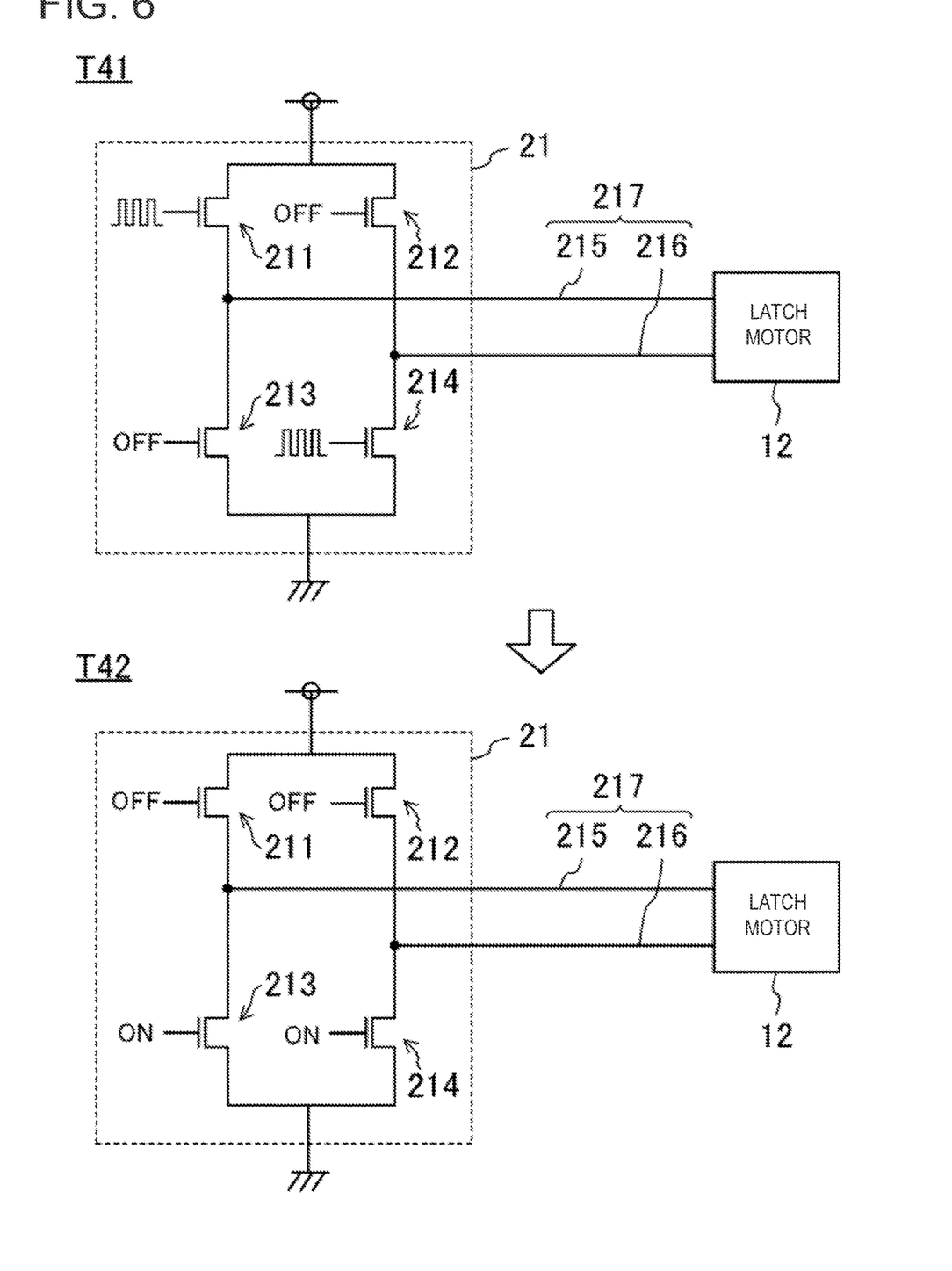
FIG. 6 is a view illustrating a configuration and an example operation of first and the second drive circuits of the second embodiment.

For example, as illustrated in an upper figure of FIG. 6, the first drive circuit 21 can use the same circuit as the first embodiment. The PLG motor 11 of this embodiment receives an input signal of the three states, and it is configured to perform the opening operation, the closing operation, and the suspending operation of the lift gate according to the input signal.

Figure 5:
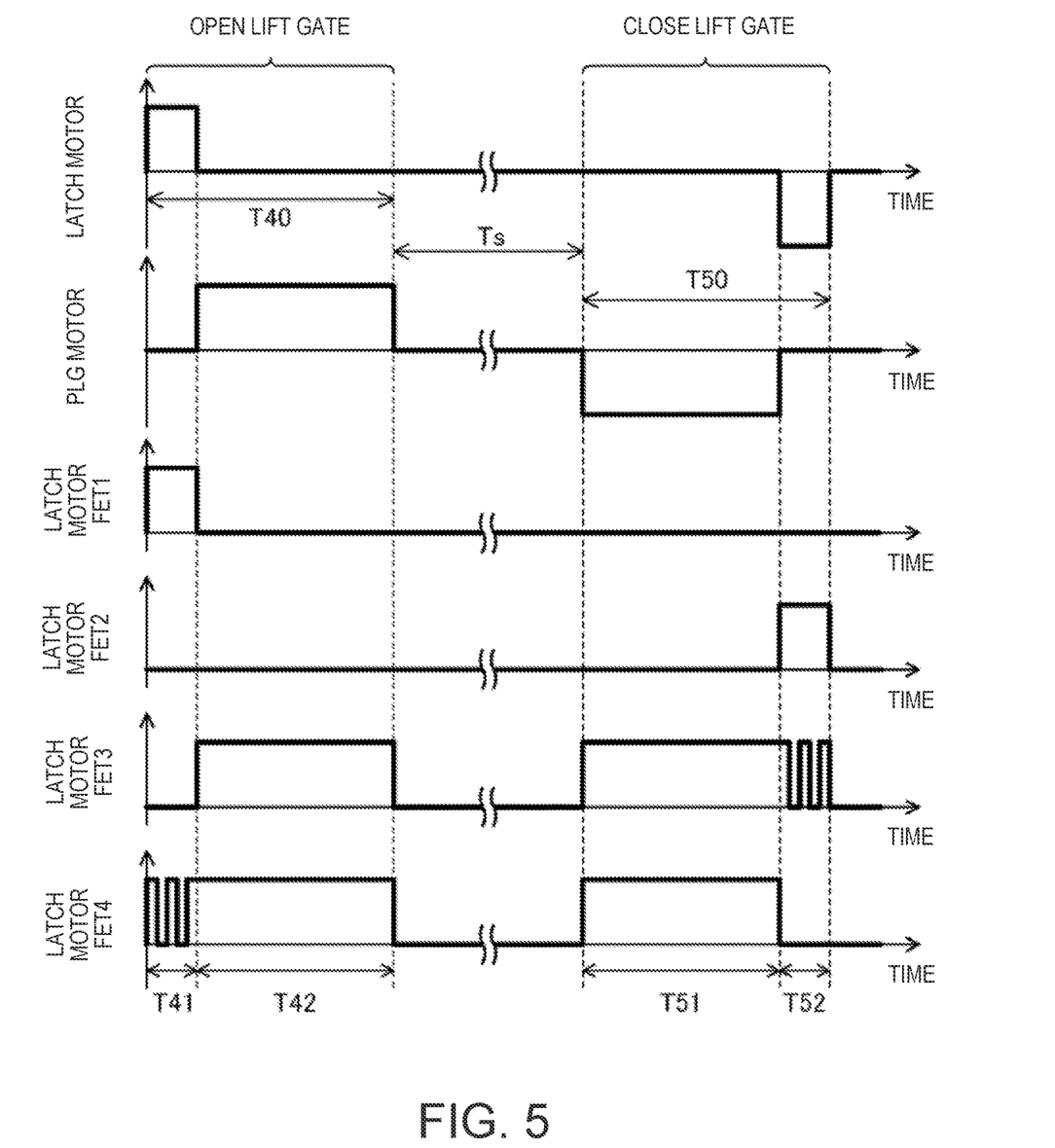
FIG. 5 is a timing chart illustrating operation of a control device for a vehicle of a second embodiment.

FIG. 5 is a timing chart illustrating operation of the motor controlling device of the second embodiment. In the example of FIG. 5, the opening operation of the lift gate 10 is performed during a period T40 (T41, T42) on the left side of this drawing, and the closing operation of the lift gate 10 is performed during a period T50 (T51, T52) on the right side of this drawing. Note that the period T40 of FIG. 5 corresponds to the period T10 of FIG. 4, and the period T50 of FIG. 5 corresponds to the period T20 of FIG. 4.

In the unlock control of the latch mechanism during the period T41, the first pre-driver carries out an OFF control of the second FET 212 and the third FET 213 of the first drive circuit 21. Moreover, the first pre-driver carries out an ON control of the first FET 211, and outputs a pulse signal at a given period to the fourth FET 214 (see the upper figure of FIG. 6). Therefore, the unlock operation of the latch mechanism is performed. Moreover, the second drive circuit 22 outputs the ground potential indicating that the opening and closing of the lift gate 10 are not carried out, and the PLG motor 11 remains in the suspended state.

In the open control of the lift gate 10 during the period T42, the second drive circuit 22 outputs a rectangular wave (positive voltage) for driving the PLG motor 11 so that the door of the lift gate 10 moves in the opening direction. Therefore, the lift gate 10 moves in the opening direction. At this time, since operation of the latch motor 12 is suspended and the PLG motor 11 is driven, the first pre-driver carries out an ON control of the third FET 213 and the fourth FET 214 of the first drive circuit 21 (see the lower figure of FIG. 6). At this time, the first FET 211 and the second FET 212 are controlled to OFF. Thus, the electric potential of the RM drive lines 217 can be lowered to ground potential, and an occurrence of the crosstalk problem can be avoided.

During a period Ts between the period T40 and the period T50, the first pre-driver carries out the OFF control of the first FET 211 to the fourth FET 214, similar to the first embodiment.

In the close control of the lift gate 10 during the period T51, the second drive circuit 22 outputs a rectangular wave (negative voltage) for driving the PLG motor 11 so that the door of the lift gate 10 moves in the closing direction. Therefore, the door of the lift gate 10 moves in the closing direction. At this time, since operation of the latch motor 12 is suspended and the PLG motor 11 is driven, the first pre-driver carries out the ON control of the third FET 213 and the fourth FET 214 of the first drive circuit 21. Thus, the electric potential of the RM drive lines 217 can be lowered to ground potential, and an occurrence of the crosstalk problem can be avoided.

In the lock control of the latch mechanism during the period T52, the second drive circuit 22 outputs the ground potential indicating that the door of the lift gate 10 is not operated, and the PLG motor 11 becomes in the suspended state. The first pre-driver carries out the OFF control of the first FET 211 and the fourth FET 214 of the first drive circuit 21. Moreover, the first pre-driver carries out the ON control of the second FET 212, and outputs a pulse signal at a given period to the third FET 213. Therefore, the unlock operation of the latch mechanism is performed.

As described above, also in this embodiment, the control unit 24 carries out the ON control of the third FET 213 and the fourth FET 214 of the first drive circuit 21, when operation of the latch motor 12 is suspended while the PLG motor 11 is operated. Thus, the RM drive lines 217 of the first drive circuit 21 can be lowered to ground potential, and similarly to the case of the first embodiment, the effect of the crosstalk, and the noise propagated via the ground (via the power source) can be reduced. That is, the effect of the electromagnetic noise by secondary radiation can be reduced.

Note that, although the concrete description is omitted, also an example where the second drive circuit 22 for driving the PLG motor 11 is a circuit of H-bridge type and the first drive circuit 21 for driving the latch motor 12 is a circuit of another type is similar to the above embodiment, and therefore, similar operation and effects can be obtained.

Moreover, although in the first embodiment and the second embodiment, the ON control of the third FET 213 and the fourth FET 214 of the first drive circuit 21 is carried out when the PLG motor 11 is operated and the latch motor 12 is suspended, the present disclosure is not limited to this configuration. In the following third embodiment, one example in which a transistor of the first drive circuit 21 and/or a transistor of the second drive circuit 22 is controlled in relationship with another electronic device 60, is described.

Third Embodiment

Figure 7:
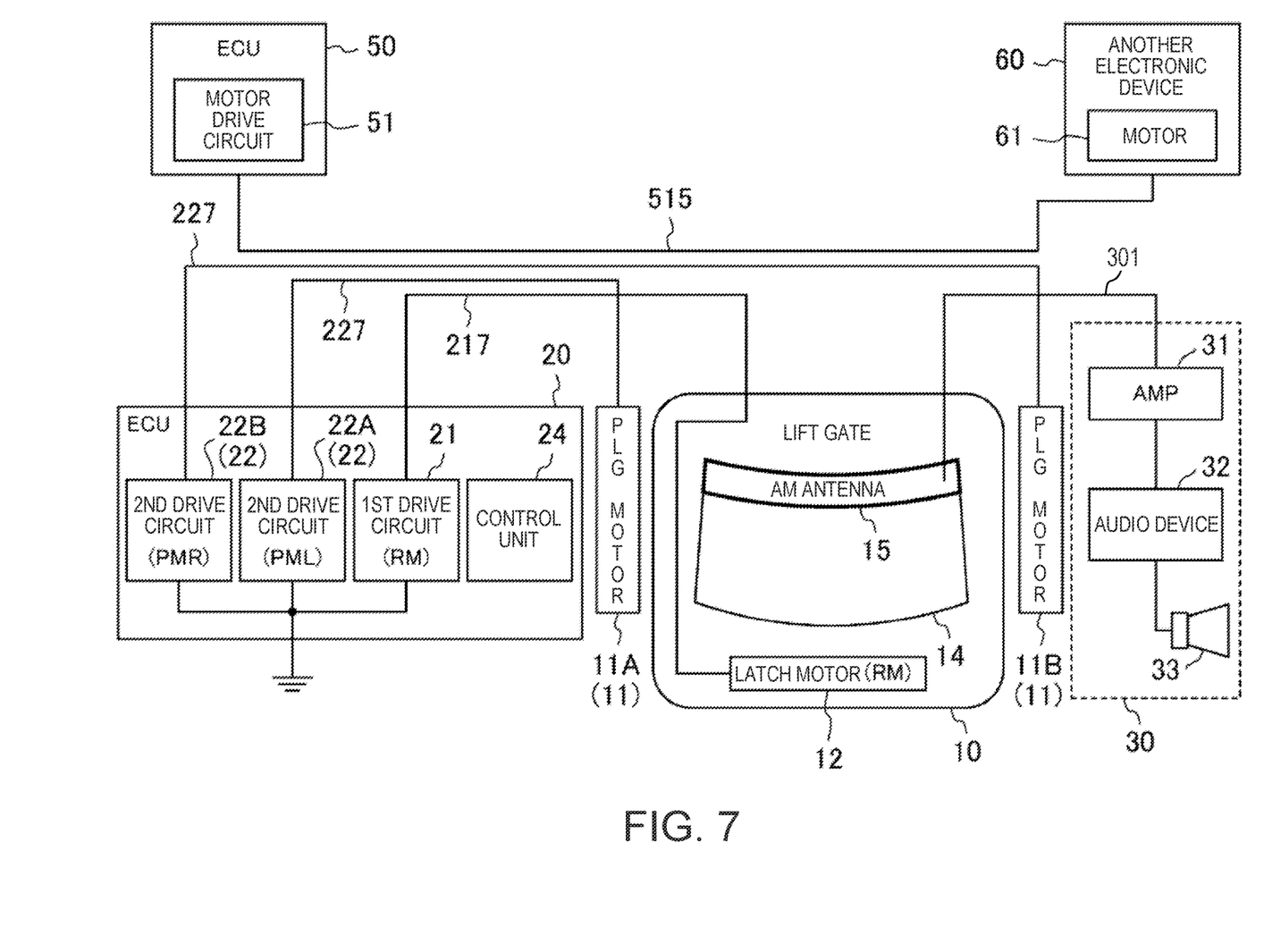
FIG. 7 is a block diagram illustrating a configuration of an on-board system of a third embodiment.

FIG. 7 is a block diagram illustrating a configuration of an on-board system of the third embodiment.

Figure 8A:
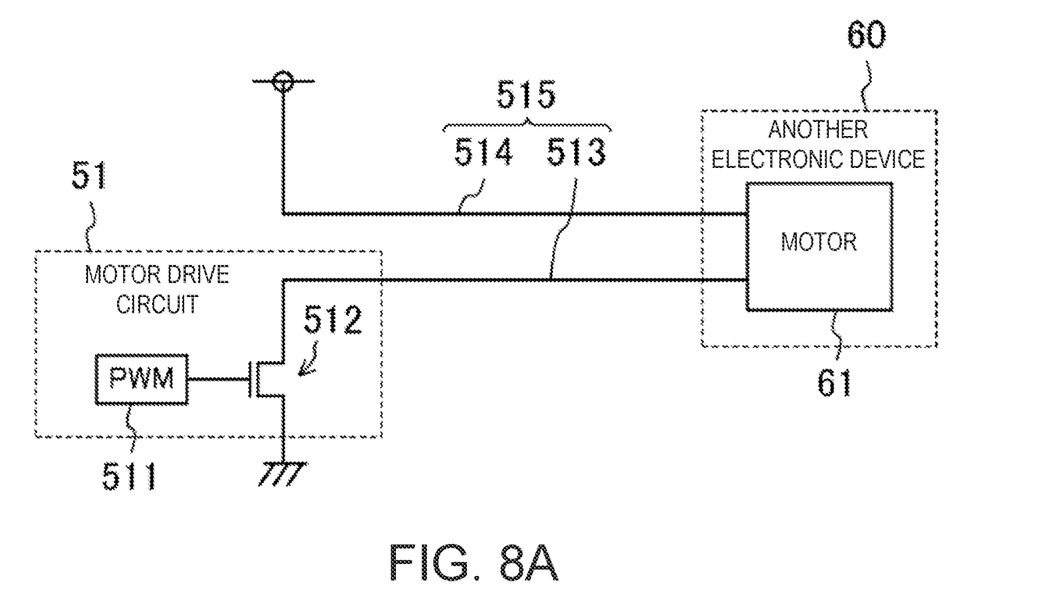
FIGS. 8A and 8B are views illustrating a configuration and an example operation of a first drive circuit of the third embodiment, and a peripheral system, respectively.
Figure 8B:
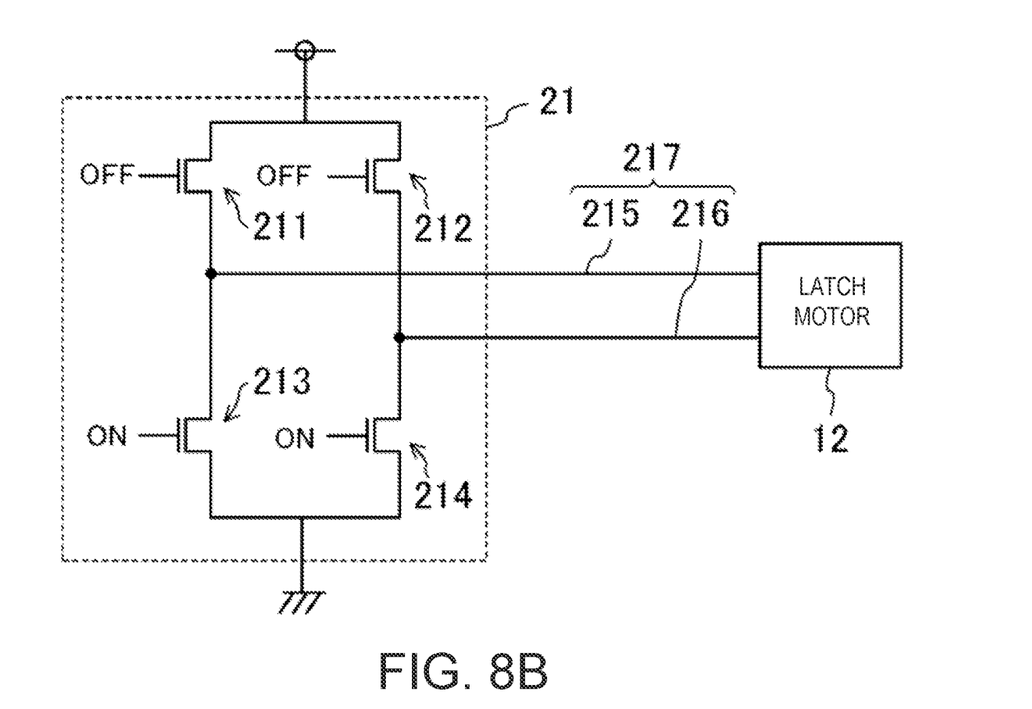

In the third embodiment, another electronic device 60 connected to an ECU 50 via a wiring line 515 is disposed, in addition to the configuration of FIG. 1. In the description, wiring lines 513 and 514 are collectively referred to as the wiring line 515. The wiring line 513 connects the terminal and the latch motor 12. The wiring line 514 connects a FET 512 of a motor drive circuit 51 and the latch motor 12. The FET 512 is controlled by a pulse width modulation (PWM) 511. The other electronic device 60 is provided with a motor 61, and the motor drive circuit 51 illustrated in FIG. 8A is built in the ECU 50. The wiring line 515, the motor RM drive lines 217, and the PM drive lines 227 are disposed in parallel to each other and close to each other (e.g., they are configured in the same wire harness). Alternatively, the ECU 50 and another electronic device 60, and the ECU 20 and electronic parts and instruments around the lift gate 10 (including the PLG motor 11 and the latch motor 12) use a common power source and a common ground. Note that another electronic device is not limited in particular, and it may be any kind of instrument. In detail, it may be a wiper device, a navigation device, an engine controller, a rear motor.

Figure 9:
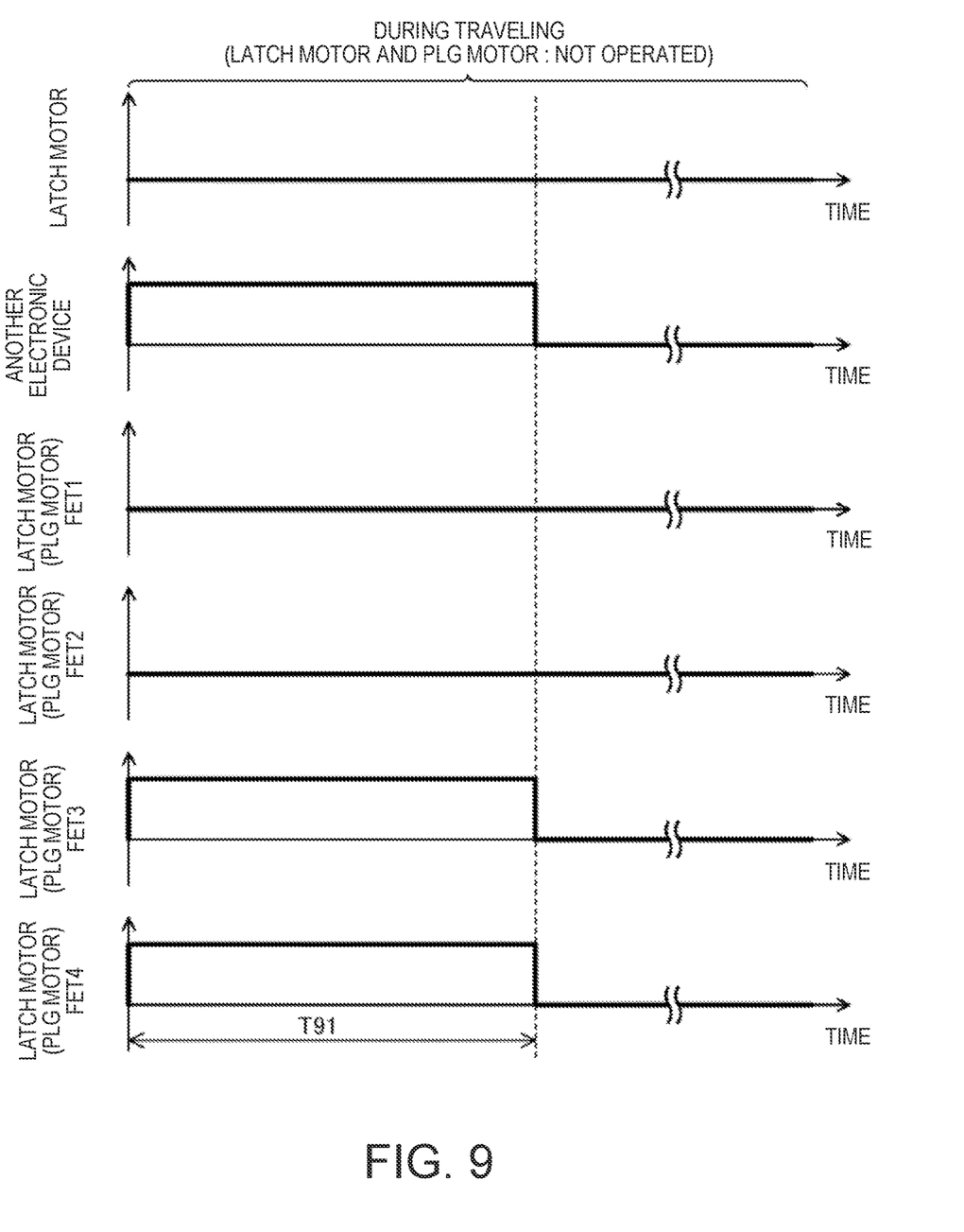
FIG. 9 is a timing chart illustrating operation of a motor controlling device of the third embodiment.

FIG. 9 is a timing chart illustrating operation of a motor controlling device of the third embodiment. In the example of FIG. 9, the vehicle travels, and the latch motor 12 and the PLG motor 11 are not operated. Moreover, in the example of FIG. 9, another electronic device 60 (e.g., motor 61) operates during a period T91 within the traveling period.

As illustrated in FIG. 9, during the period T91, since operation of the latch motor 12 is suspended and another electronic device 60 is operated, the control unit 24 carries out the ON control of the third FET 213 and the fourth FET 214 of the first drive circuit 21. At this time, the first FET 211 and the second FET 212 are controlled to OFF. Similarly, since operation of the PLG motor 11 is suspended and another electronic device 60 is operated, the control unit 24 carries out the ON control of the third FET 223 and the fourth FET 224 of the second drive circuit 22. Thus, the electric potential of the RM drive lines 217 and the PM drive lines 227 can be lowered to the ground potential, and an occurrence of the crosstalk problem can be avoided.

As described above, also in this embodiment, the control unit 24 carries out the ON control of the third FET 213 and the fourth FET 214 of the first drive circuit 21, when it suspends operation of the latch motor 12 while another electronic device 60 is operated. Similarly, the control unit 24 carries out the ON control of the third FET 223 and the fourth FET 224 of the second drive circuit 22, when operation of the PLG motor 11 is suspended while another electronic device 60 is operated. Thus, the RM drive line 217 and the PM drive lines 227 can be dropped to the ground potential, and the effect of the crosstalk, and the noise propagated via the ground (via the power source) can be reduced, similar to the case of the first embodiment.

Note that although in the third embodiment the ON control of both the third FET 213 and the fourth FET 214 of the first drive circuit 21, and the third FET 223 and the fourth FET 224 of the second drive circuit 22 is carried out to drop them to the ground potential, the ON control of the third FET and the fourth FET for either the first drive circuit 21 or the second drive circuit 22 may be carried out.

Moreover, although in the above embodiments the H-bridge circuit of the first drive circuit 21 and the second drive circuit 22 is comprised of FETs, the H-bridge circuit may be comprised of other switching elements (e.g., transistors other than FETs).

The technology disclosed herein is useful for the motor controlling device which controls the on-board motor.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims. Further, if used herein, the phrase "and/or" means either or both of two stated possibilities.

DESCRIPTION OF REFERENCE CHARACTERS

11 PLG Motor (Second On-board Motor)
12 Latch Motor (First On-board Motor)
15 Receiving Antenna (Antenna Element)
21 First Drive Circuit
22 Second Drive Circuit
24 Control Unit (Controlling Circuit)
32 Audio Device
211 First FET (First Switching Element)
212 Second FET (First Switching Element)
213 Third FET (First Switching Element)
214 Fourth FET (First Switching Element)
217 RM Drive Line (First Wiring)
221 First FET (Second Switching Element)
222 Second FET (Second Switching Element)
223 Third FET (Second Switching Element)
224 Fourth FET (Second Switching Element)

What is claimed is:

1. A motor controlling device configured to control an on-board motor, the on-board motor comprising a first on-board motor and a second on-board motor, the motor controlling device comprising:
   a drive circuit including a first drive circuit of an H-bridge type comprised of a plurality of first switching elements and configured to drive the first on-board motor, and a second drive circuit of an H-bridge type comprised of a plurality of second switching elements and configured to drive the second on-board motor; and
   a controlling circuit configured to control the on-board motor by controlling the drive circuit, the controlling circuit carrying out and keeping an ON control of the plurality of first switching elements connected to a ground, when not operating the first on-board motor and when operating the second on-board motor,
   wherein the first drive circuit is connected to the first on-board motor by first drive lines,
   wherein the second drive circuit is connected to the second on-board motor by second drive lines,
   wherein the first drive lines and the second drive lines are disposed in a same wire harness, and
   wherein the operating the second on-board motor is performed by pulse modulation (PM) control signals for controlling at least one of the plurality of second switching elements of the second drive circuit, outputted from the controlling circuit.

2. The motor controlling device of claim 1,
   wherein the controlling circuit carries out an ON control of at least one of the plurality of second switching elements connected to the ground, when operating the first on-board motor and not operating the second on-board motor.

3. The motor controlling device of claim 1, wherein each switching element is a field-effect transistor (FET).

4. An on-board system, comprising:
   an on-board motor;

the motor controlling device of claim 1, connected to the on-board motor through a first wiring and configured to control the on-board motor;
an antenna element configured to receive broadcast wave; and
an audio device connected to the antenna element through a second wiring different from the first wiring,
wherein the first wiring is disposed near the antenna element and/or the second wiring.

5. The motor controlling device of claim 1, wherein each switching element is a field-effect transistor (FET).

6. The motor controlling device of claim 1,
wherein the first on-board motor is a latch motor configured to drive a latch mechanism configured to lock a lift gate of an automatic opening-and-closing type in a closed state,
wherein the second on-board motor is a power lift gate (PLG) motor configured to drive a drive unit configured to perform an automatic opening-and-closing operation of the lift gate,
wherein the first drive circuit is connected to the latch motor by the first drive lines, and
wherein the second drive circuit is connected to the PLG motor by the second drive lines.

7. The motor controlling device of claim 1,
wherein the first switching elements of the first drive circuit are comprised of:
a first leg that is a series circuit of a first field-effect transistor (FET) and a third FET;
a second leg that is a series circuit of a second FET and a fourth FET;
an output line connected to a connection line connecting the first FET to the third FET; and
an output line connected to a connection line connecting the second FET to the fourth FET, and
wherein the second switching elements of the second drive circuit are comprised of:
a third leg that is a series circuit of a fifth FET and a seventh FET;
a fourth leg that is a series circuit of a sixth FET and an eighth FET;
an output line connected to a connection line connecting the fifth FET to the seventh FET; and
an output line connected to a connection line connecting the sixth FET to the eighth FET.

8. The motor controlling device of claim 6,
wherein the first switching elements of the first drive circuit are comprised of:
a first leg that is a series circuit of a first field-effect transistor (FET) and a third FET;
a second leg that is a series circuit of a second FET and a fourth FET;
an output line connected to a connection line connecting the first FET to the third FET; and
an output line connected to a connection line connecting the second FET to the fourth FET, and
wherein the second switching elements of the second drive circuit are comprised of:
a third leg that is a series circuit of a fifth FET and a seventh FET;
a fourth leg that is a series circuit of a sixth FET and an eighth FET;
an output line connected to a connection line connecting the fifth FET to the seventh FET; and
an output line connected to a connection line connecting the sixth FET to the eighth FET.

9. The motor controlling device of claim 8,
wherein the controlling circuit includes a first pre-driver configured to output ring modulation (RM) control signals for controlling the first to fourth FETs of the first drive circuit, and a second pre-driver configured to output pulse modulation (PM) control signals for controlling the fifth to eighth FETs of the second drive circuit, and
wherein the controlling circuit controls the first and second pre-drivers so that:
the first pre-driver carries out an OFF control of the second FET and the third FET of the first drive circuit, carries out an ON control of the first FET, and outputs a pulse signal at a given period to the fourth FET, and
the second pre-driver carries out an ON control of the seventh FET and eighth FET connected to the ground in the second drive circuit, and carries out an OFF control of the fifth FET and the sixth FET.

10. The motor controlling device of claim 6,
wherein the latch motor is disposed on a lower side of the lift gate,
wherein the lift gate includes an antenna element configured to receive a broadcast wave and disposed on a rear window glass of the lift gate, and
wherein the first drive lines are run from an upper side to the lower side of the lift gate proximate the antenna element.

* * * * *